United States Patent [19]

Nakamura et al.

[11] Patent Number: 5,383,679
[45] Date of Patent: Jan. 24, 1995

[54] ARRANGEMENT OF SUSPENSION SYSTEM FOR AUTOMOTIVE VEHICLE

[75] Inventors: Michiya Nakamura; Shinobu Kakizaki, both of Atsugi, Japan

[73] Assignee: Unisia Jecs Corporation, Atsugi, Japan

[21] Appl. No.: 26,309

[22] Filed: Mar. 4, 1993

[30] Foreign Application Priority Data

Mar. 4, 1992 [JP] Japan ............... 4-010749[U]
Apr. 16, 1992 [JP] Japan ............... 4-024105[U]

[51] Int. Cl.6 ............... B60G 17/015; B60G 17/08
[52] U.S. Cl. ............... 280/707; 188/299; 310/68 R; 318/254
[58] Field of Search ............... 280/707; 188/299; 318/254; 310/68 R

[56] References Cited

U.S. PATENT DOCUMENTS

| | | | |
|---|---|---|---|
| 4,698,542 | 10/1987 | Muller | 318/254 X |
| 4,776,437 | 10/1988 | Ishibashi et al. | 280/707 X |
| 4,883,982 | 11/1989 | Forbes et al. | 318/254 X |
| 4,892,328 | 1/1990 | Kurtzman et al. | 280/707 |
| 5,064,031 | 11/1991 | Kakizaki | 188/299 |
| 5,195,772 | 3/1993 | Bachrach et al. | 280/707 |

FOREIGN PATENT DOCUMENTS

| | | |
|---|---|---|
| 0542573 | 5/1993 | European Pat. Off. |
| 3518858 | 11/1985 | Germany. |
| 3931410 | 3/1990 | Germany. |
| 9100188 | 1/1991 | Germany. |
| 61-215106 | 9/1986 | Japan. |
| 0067408 | 3/1989 | Japan ............... 280/707 |
| 2262794 | 6/1993 | United Kingdom. |

OTHER PUBLICATIONS

"Koni, Shock Absorbers With Remote Control", 1989, Koni, Oud Beyerland, Holland (the whole document).

Primary Examiner—Brian L. Johnson
Assistant Examiner—Peter C. English
Attorney, Agent, or Firm—Ronald P. Kananen

[57] ABSTRACT

An arrangement of a vehicular suspension system is disclosed in which each drive circuit which outputs a drive current to a corresponding one of the actuators installed on each shock absorber is arranged at a position adjacent to the corresponding one of actuators. Thus, transmission of signals from each drive circuit to the corresponding one of the actuators is unaffected by electrical disturbance. In addition, a length of a wire connected between the corresponding one of the actuators and the drive circuit can be shortened. The generation of noises causing the electromagnetic wave interference can be prevented. In another preferred embodiment, a printed circuit board containing each drive circuit is mounted in a casing of the corresponding one of the actuators of the shock absorbers.

5 Claims, 13 Drawing Sheets

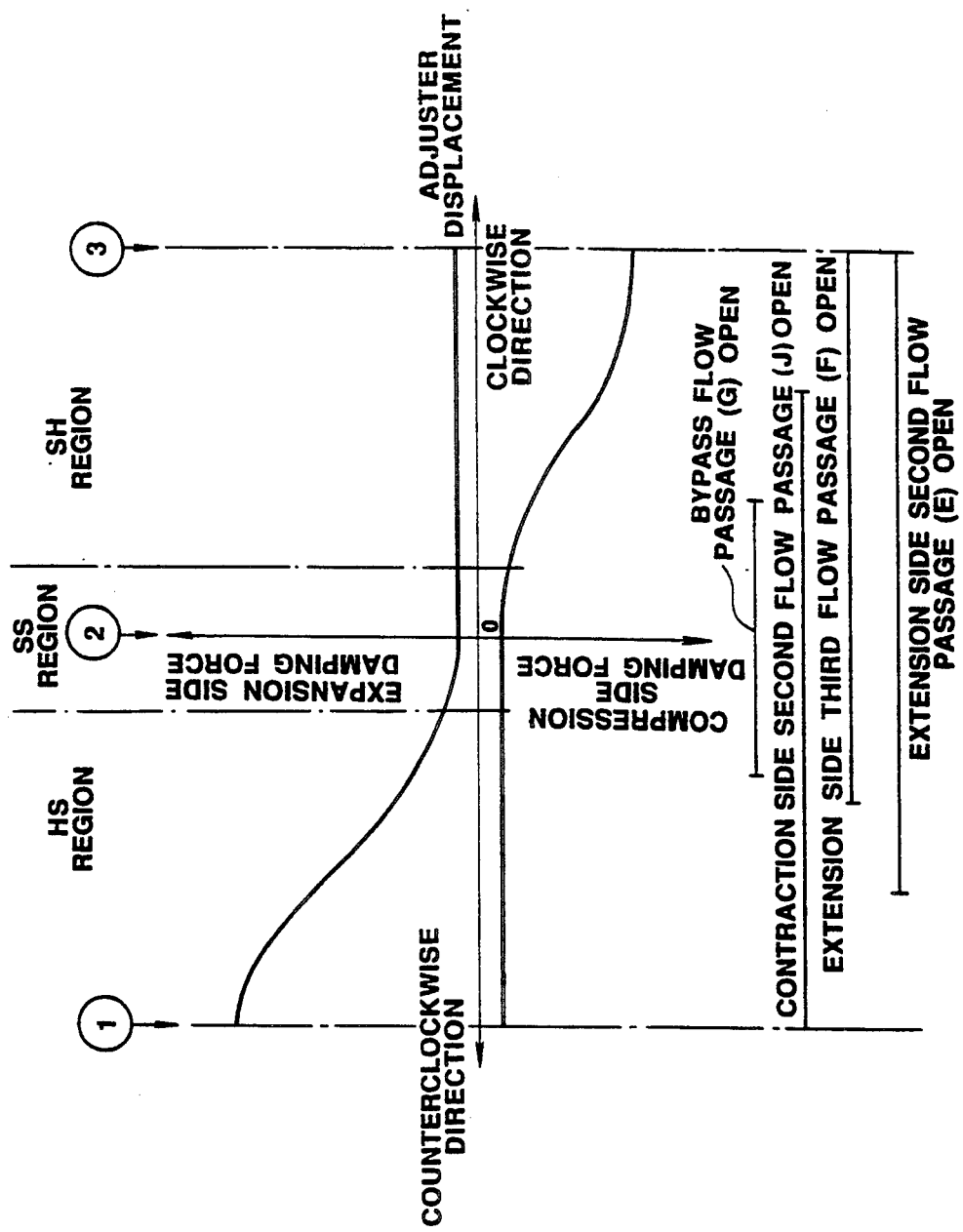

ARRANGEMENT OF SUSPENSION SYSTEM FOR AUTOMOTIVE VEHICLE

BACKGROUND OF THE INVENTION

1. Field of The Invention

The present invention relates generally to a suspension system for an automotive vehicle which executes a damping force characteristic control over one or more shock absorbers. The present invention, particularly, relates to a suspension system for an automotive vehicle which can control the shock absorbers so as to provide an optimum damping characteristic for each of the respective shock absorbers without the generation of or interference by, electromagnetic waves and without any reduction in the actuator's driving torque.

2. Description of The Background Art

A Japanese Patent Application First Publication (Tokkai) No. Showa 61-215106 exemplifies a previously proposed suspension system for an automotive vehicle which carries out the damping characteristic controls.

In this previously proposed vehicular suspension system, each actuator which is actuated in response to the drive signal to rotate a damping coefficient changing disc which is disposed on a piston rod of each shock absorber. A drive circuit which drives each of the shock absorber actuators and a control unit which supplies a control signal to each of the drive circuits, is disposed within a vehicle passenger compartment. A wire harness is used to connect the above described control components.

Since a wire harness is used to interconnect between each control component (control unit or so-called, controller), drive circuits, and actuators described above, the wiring in the vehicle passenger compartment becomes quite complex.

It is possible to omit one line of the wire harness which interconnects both the control unit and drive circuit if the control unit is integrated with the drive circuit. However, the dimension of the control unit is accordingly increased and space in which to dispose the control unit becomes difficult to find.

Furthermore, since the branched lines of the wire harness which connect the drive circuits to the respective actuators are relatively long, radio wave (electromagnetic wave) noises are radiated from the branched lines and the actuator's driving torque is correspondingly reduced due to voltage drop caused by the ohmic resistances of the branched lines of the wire harness.

SUMMARY OF THE INVENTION

It is, therefore, a principal object of the present invention to provide an improved suspension system for an automotive vehicle which exhibits a reduced susceptibility to radio noise, generation and propagation of electromagnetic wave noises via related lines of the wire harness without reduction of the actuators' driving torque and without a bulky control unit.

The above-described object is achieved by providing a suspension system for an automotive vehicle, comprising: a) a plurality of shock absorbers, each having an actuator; b) a control unit; and c) a plurality of drive circuits, each being arranged at a position adjacent to a corresponding actuator such that transmission of signals from each drive circuit to the corresponding actuator is unaffected by electrical disturbance (noise).

BRIEF DESCRIPTION OF THE DRAWINGS

FIG. 6 is a chart showing the changes in damping characteristics of a pulse motor of the shock absorber.

DESCRIPTION OF THE PREFERRED EMBODIMENTS

Reference will, hereinafter, be made to the drawings in order to facilitate a better understanding of the present invention.

First Preferred Embodiment

Figure 1:
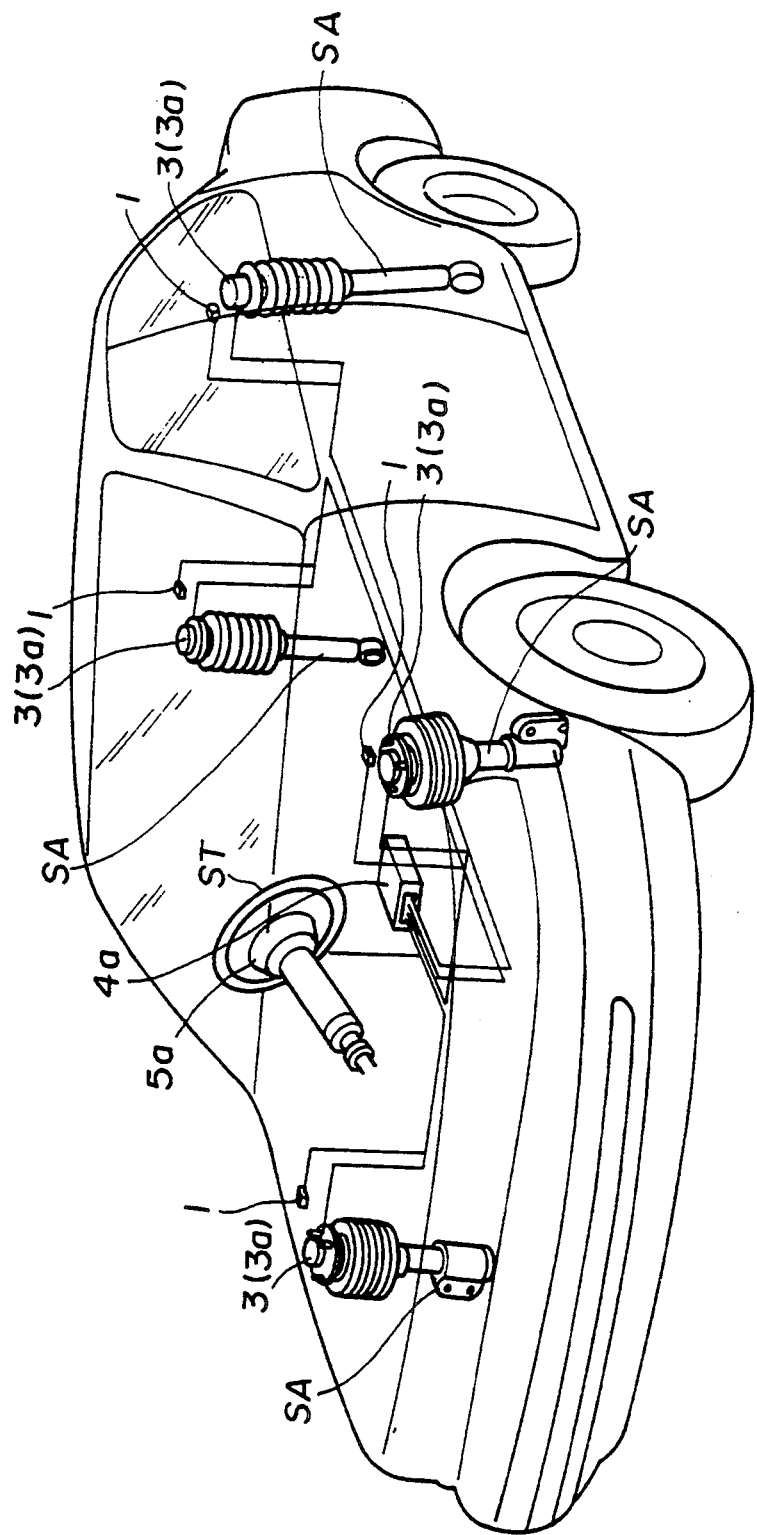
FIG. 1 is an perspective view of an automotive suspension system according to a first preferred embodiment of the invention.

FIG. 1 shows a system configuration of a vehicular suspension system according to a first preferred embodiment according to the present invention.

As shown in FIG. 1, four shock absorbers SA are interposed between a vehicular body and respective road wheels. A steering angle sensor 5a is installed in a steering wheel system ST of the vehicle for detecting a steering angle. A vertical (upward and downward with respect to the vehicle body) sprung mass acceleration sensor 1 (hereinafter, also referred to as a vertical G sensor) is disposed on a part of the vehicle body adjacent to each shock absorber SA.

Each shock absorber SA is formed such as to change the damping force characteristic the shock absorber in response to a drive force provided by means of a pulse (or so-called, stepping) motor or actuator 3.

Figure 2:
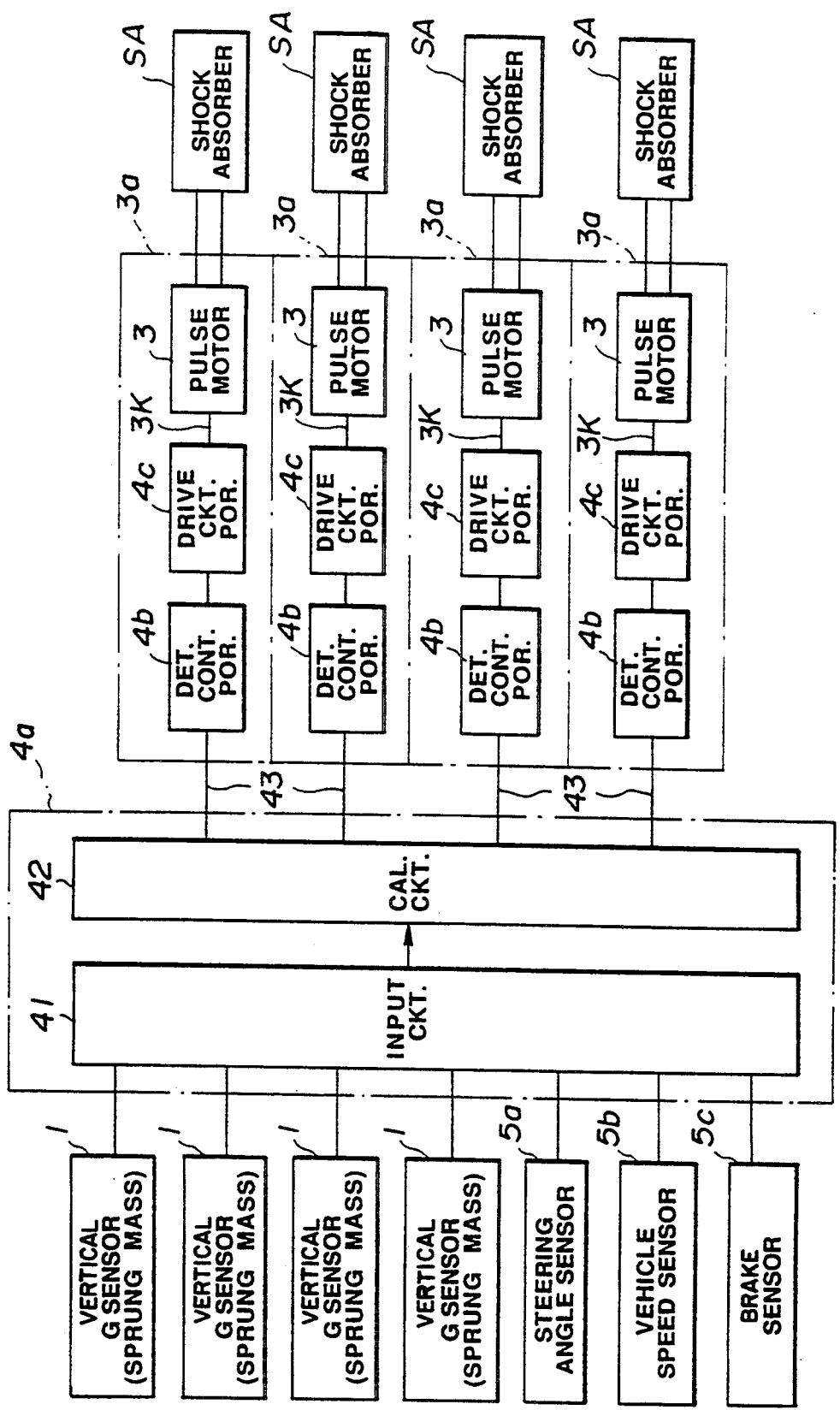
FIG. 2 is a circuit block diagram of a suspension system shown in FIG. 1.

FIG. 2 is a circuit block diagram of the suspension system described above and shown in FIG. 1.

As shown in FIG. 2, a control portion of the suspension system is divided into three parts: a damping characteristic control circuit portion 4a; a determination control circuit portion 4b; and a drive circuit portion 4c.

The damping characteristic control circuit portion 4a receives signals such as those from the vehicle behavior detecting means, from the vehicle speed sensor 5b, brake sensor 5c as well as the vertical G sensor 1 and steering angle sensor 5a, derives the optimum damping characteristic in accordance with the vehicle behavior and outputs a signal which commands a drive direction for the corresponding one of the pulse motors 3.

Referring back to FIG. 1, the damping characteristic control portion 4a comprises a microcomputer installed, for example, at an adjacent position near to the driver's seat. The damping coefficient control circuit portion 4a includes an input circuit 41 which receives the signals derived from the respective sensors 1, 5a, 5b, and 5c and converts them into control signals; and a calculation circuit 42 which calculates the optimum damping coefficient characteristic for the corresponding one of the shock absorbers SA on the basis of the vehicle behavior derived via the input circuit 41 and outputs a signal to command the drive direction of the corresponding one of the pulse motors 3 so as to provide the corresponding one of the shock absorbers SA with the calculated optimum damping coefficient.

The determination control circuit portion 4b is a circuit which determines the drive of the pulse motor 3 in response to the output command signal from the damping characteristic control portion 4a. The drive circuit portion 4c serves to control the current used to drive each corresponding pulse motor 3 on the basis of the result of the determination performed by the determination control circuit portion 4b.

In the first embodiment, both circuit portions 4b, 4c are installed as integral parts of the corresponding one of the pulse motors 3 so that each line 43 of wire harness is used to interconnect the respective determination control circuit block 4b and the calculation circuit 42 of the damping characteristic control circuit portion 4a.

Figure 13:
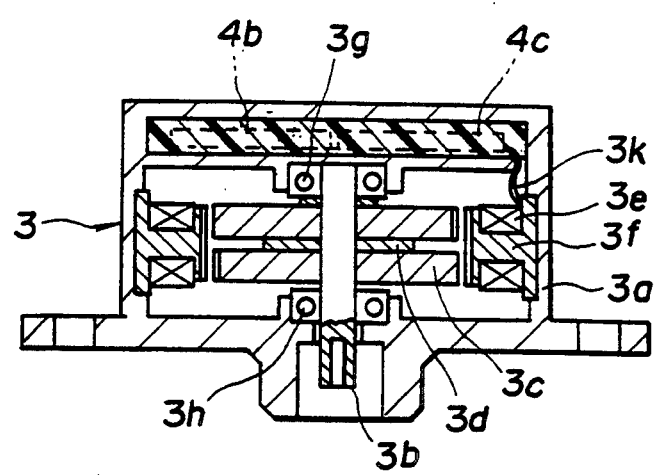
FIG. 13 is an enlarged cross-sectional view of a part of the pulse motor used in the first preferred embodiment.

FIG. 13 shows an enlarged view of the essential features of each pulse motor 3.

As shown in FIG. 13, each pulse motor 3 includes: a housing 3a; an output axle 3b, rotor core 3c, and rotor magnet 3d, a stator coil 3e, and a stator core 3f. It is noted that, as shown in FIG. 13, reference numerals 3g and 3h denote bearings. Each determination control circuit portion 4b and drive circuit portion 4c are housed on the upper end within the housing 3a. A harness 3k serves to connect the drive circuit portion 4c and the corresponding stator coil 3e.

Next, reference will be made back to FIG. 3 which shows a cross-sectional structure of each shock absorber SA.

Figure 3:
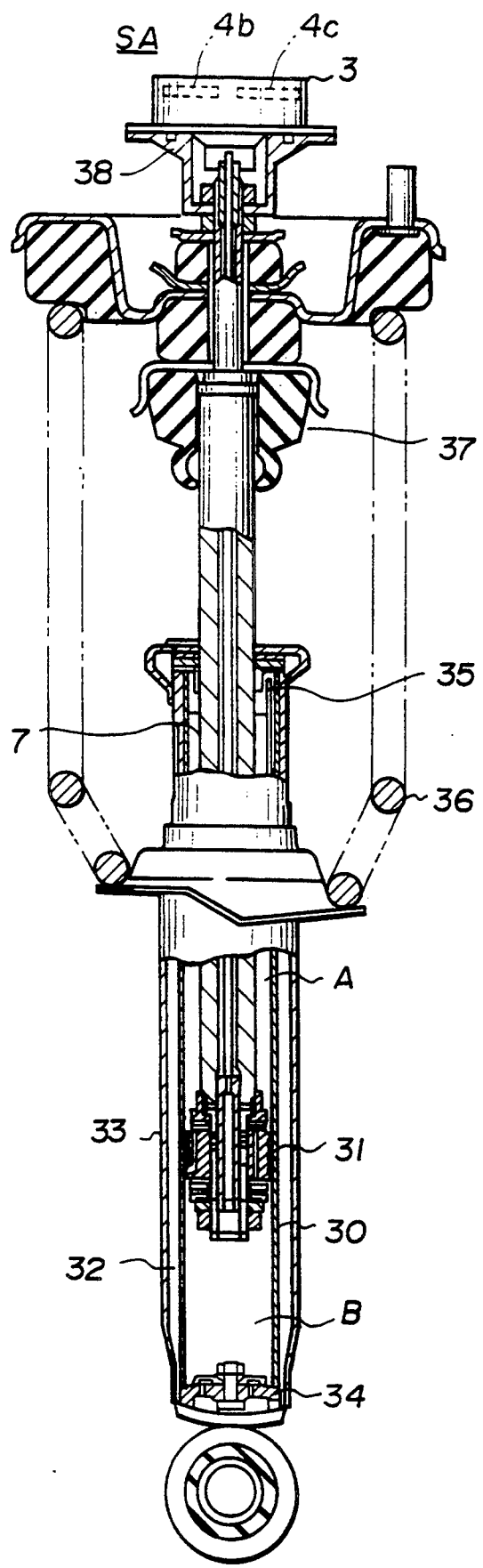
FIG. 3 is a cross-sectional view of a shock absorber applicable to the suspension system according to the first preferred embodiment.

Each shock absorber SA, as shown in FIG. 3 includes: a cylinder 30; a piston 31 for defining both upper and lower chambers A and B; an outer envelope 33 which forms a reservoir chamber 32 on the outer periphery of the cylinder 30; a base (or bottom base) 34 for defining the lower chamber B and reservoir chamber 32; a guide member 35 for defining the upper chamber A and reservoir chamber 32 and for guiding a slide motion of a piston rod 7 linked to the piston main body 32; a suspension spring 36 interposed between the outer envelope 33 and vehicular body; and a bumper rubber member (or bushing) 37.

It is noted that each pulse motor 3 is attached to the upper end portion of the piston rod 32 via a bracket 38.

Figure 4:
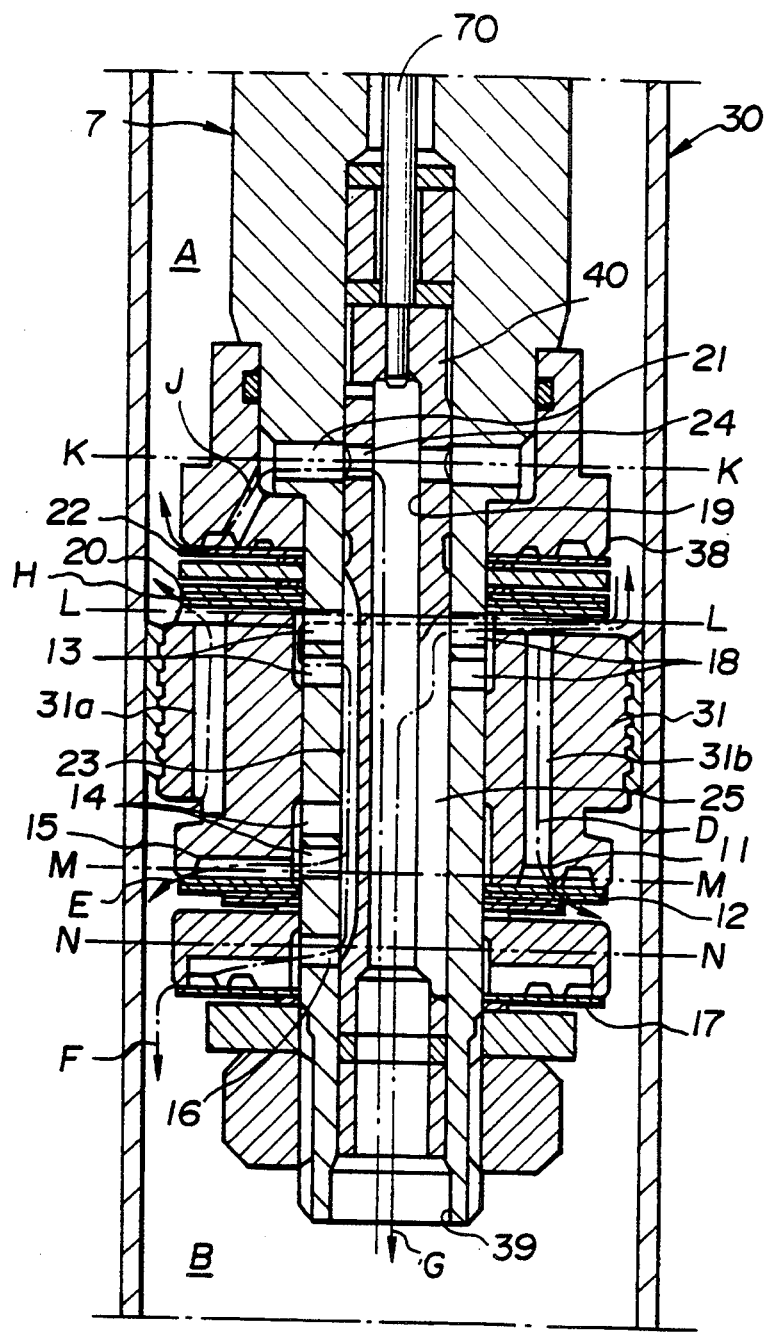
FIG. 4 is an enlarged cross-sectional view of a piston of the shock absorber shown in FIG. 1.
Figure 5:
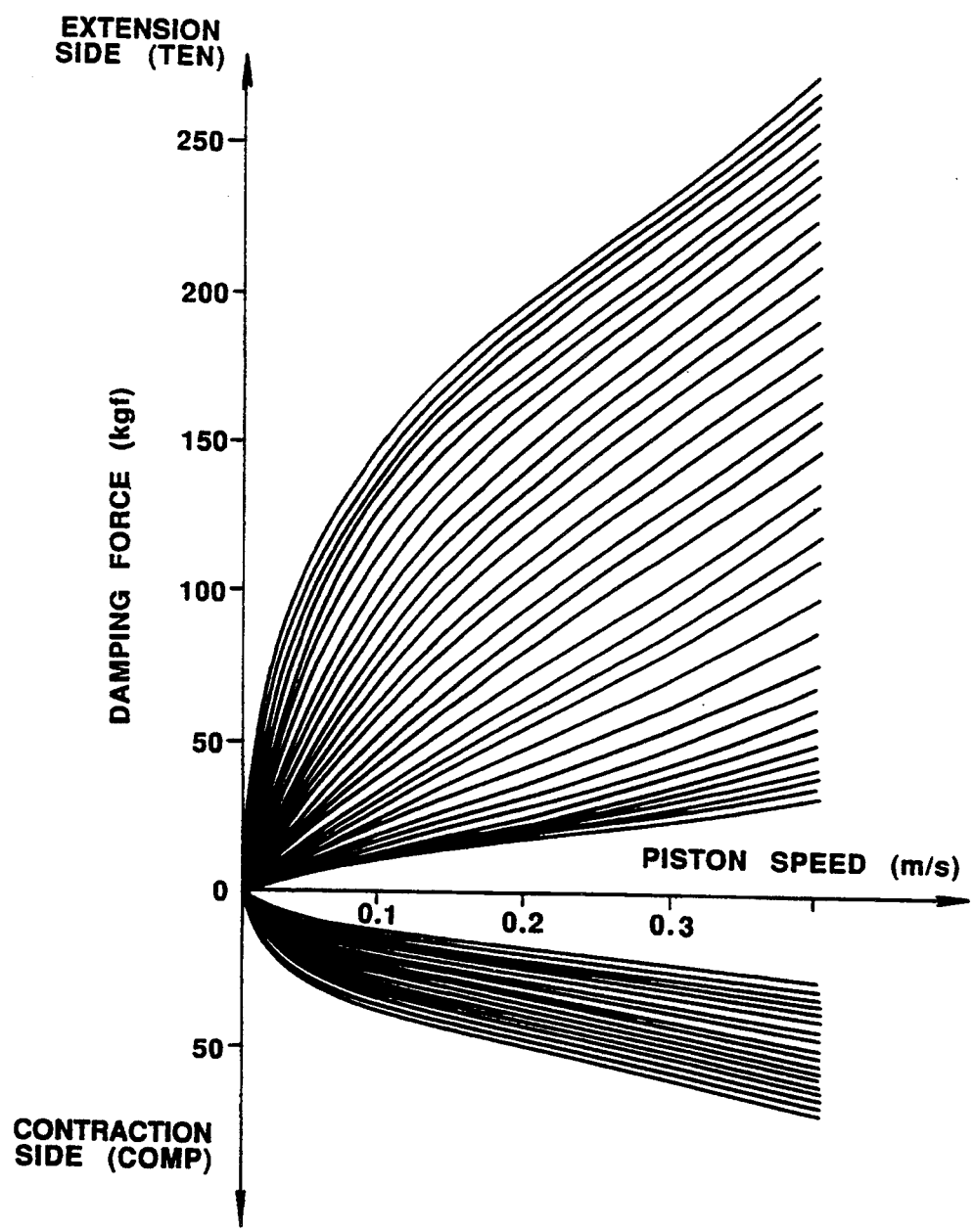
FIG. 5 is a graph showing a damping force with respect to a piston speed characteristic produced in the shock absorber shown in FIG. 3.

FIG. 4 shows an enlarged cross-sectional view of the piston 31.

As shown in FIG. 4, penetrating holes 31a, 31b are formed in the piston 31. In addition, an extension stroke side damping valve 12 and contraction stroke side damping valve 20 are installed which open or close the respective penetrating holes 31a, 31b, respectively.

A communication hole 39 is formed in an axial center of a piston rod 7, the piston rod 7 penetrating through the piston 31. The communication hole 39 serves to communicate the upper chamber A and lower chamber B (extension stroke side second flow passage E, expansion stroke side third flow passage F, a bypass flow passage G, an pressure stroke side second flow passage J as will be described later). Furthermore, the adjuster 40 in FIG. 4 serves to adjust a flow passage area of the communication hole 39. An extension stroke side check valve 17 and contraction stroke side check valve 22 are installed which enable and disable the flow in the communication hole 39 according to the direction of the flow of the fluid. The adjuster 40 is rotated by means of the pulse motor 3, shown in FIG. 3, via a control rod 70. In addition, first port 21, second port 13, third port 18, fourth port 14, and fifth port 16 are formed on the piston rod 7.

On the other hand, the adjuster 40 is formed with a hollow portion 19, a first lateral hole 24 and second lateral hole 25. Furthermore, a vertical groove 23 is formed in an outer periphery of the adjuster 40.

The first lateral hole 24 and second lateral hole 25 serve to communicate between the inner portion of the adjuster 40 and outer portion thereof.

Hence, four fluid flow passages are formed between the upper chamber A and lower chamber B as fluid flow communicable passages in the extension stroke:

1) the extension stroke side first flow passage D from the penetrating hole 31b to the lower chamber B via an inner side of the opened extension side damping valve 12;
2) the extension stroke side second flow passage E from the second port 13, longitudinal groove 23, and fourth port 14 to the lower chamber B via the outer periphery of the extension stroke side damping valve 12;
3) the extension stroke side third flow passage F from the second port 13, longitudinal groove 23, and fifth port 16 to the lower chamber B via the opened extension stroke side check valve 17; and
4) the bypass flow passage G from the third port 18, second lateral hole 25, and hollow portion 19 to the lower chamber B.

On the other hand, as the fluid flow passages of the fluid in the contraction (or compression) stroke side, the following three passages are formed:

1) a contraction stroke side first flow passage H from the penetrating hole 31a to the upper chamber A via the opened contraction stroke side damping valve 20;

2) a contraction stroke side second flow passage J from the hollow portion 19, first lateral hole 24, and first port 21 to the upper chamber A via the opened contraction stroke side check valve 22; and 3) a bypass flow passage G from the hollow portion 19, second lateral hole 25, and third port 18 to the upper chamber A.

That is to say, each shock absorber SA is so constructed that its damping coefficient is variable via the adjustment of the adjuster 40 at the multiple stages.

In other words, when, in each shock absorber SA, each adjuster 40 is pivoted in the counterclockwise direction from a state where both extension and compression stroke sides provide the soft regions (hereinafter referred to as soft region SS) as shown in FIG. 6, the damping coefficient is changeable by the multiple stages only at the expansion stroke side and compression stroke side being fixed (hereinafter referred to as extension stroke side hard region HS).

On the contrary, when the adjuster 40 is pivoted in the clockwise direction, the damping characteristic is such as to change in multiple stages only at the compression stroke side, the expansion stroke side being in the fixed state of the low damping coefficient side (hereinafter referred to as compression stroke side hard region SH).

Figure 7A:
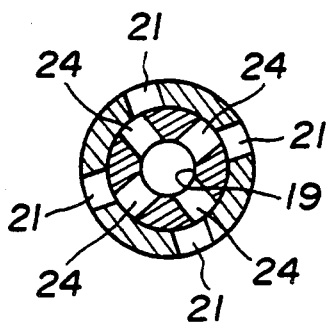
FIGS. 7 (A) through 7 (C) are cross-sectional views of the piston taken along line K—K of FIG. 4.
Figure 7B:
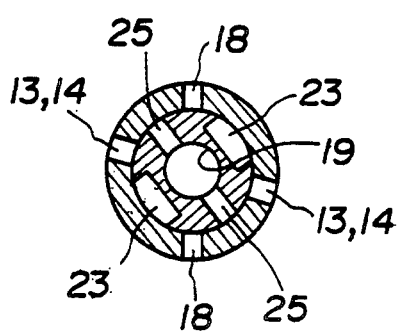
Figure 7C:
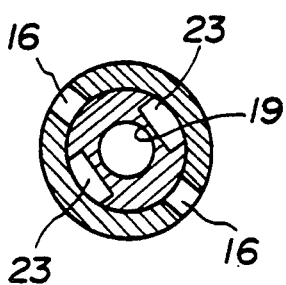
Figure 8A:
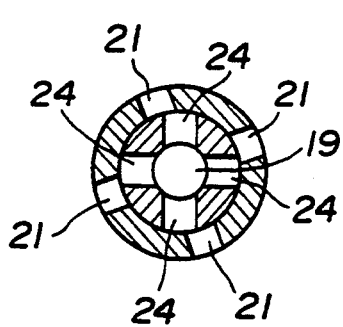
FIGS. 8 (A) through 8 (C) are cross-sectional views of the piston taken along the line M—M of FIG. 4.
Figure 8B:
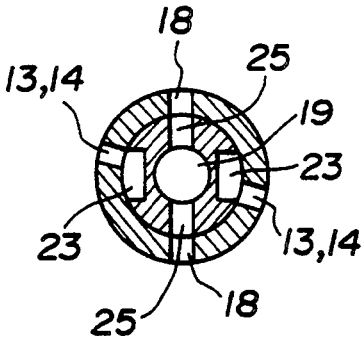
Figure 8C:
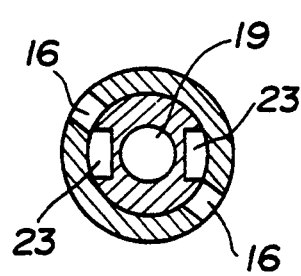
Figure 9A:
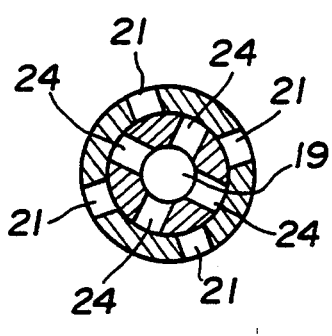
FIGS. 9 (A) through 9 (C) are cross-sectional views of the piston taken along the line N—N of FIG. 4.
Figure 9B:
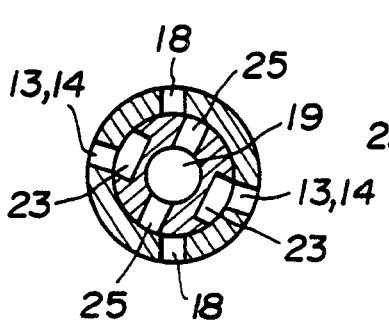
Figure 9C:
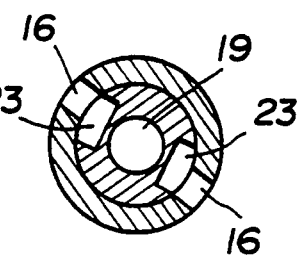

When, in FIG. 6, the adjuster 40 is placed at any one of the positions ①, ②, and ③, respectively, FIGS. 7 (A) through 7 (C), FIG. 8 (A) through 8 (C), and FIGS. 9 (A) through 9 (C) indicate respective cross sectional views cut away along the lines K—K, M—M, and N—N in FIG. 4.

Figure 10:
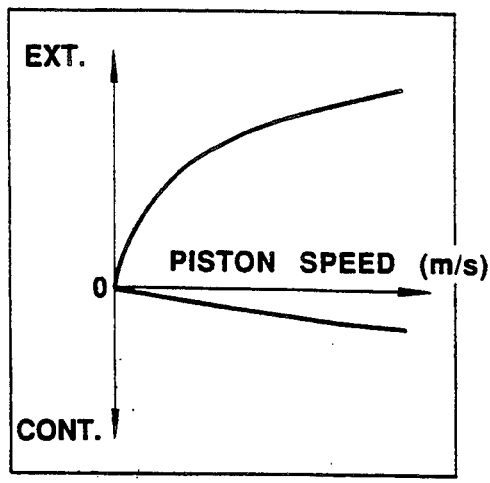
FIG. 10 is a damping force characteristic graph showing the characteristics produced when the shock absorber enters an extension stroke side "hard" region.
Figure 11:
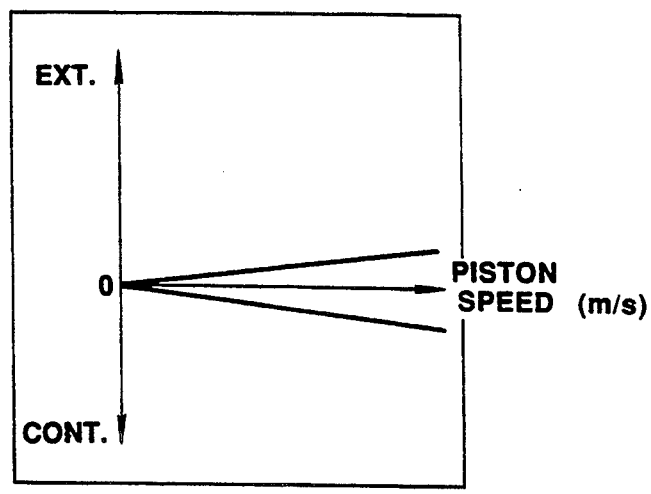
FIG. 11 is a damping force characteristic graph showing the characteristics produced when the shock absorber enters both extension and compression stroke "side" soft states.
Figure 12:
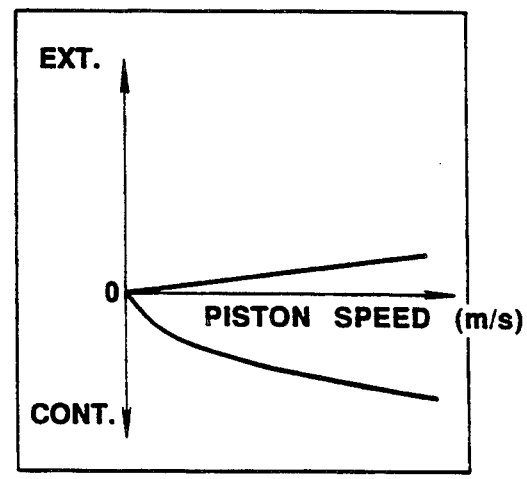
FIG. 12 is a damping force characteristic graph showing the characteristics produced when the shock absorber enters the compression stroke side "hard" state.

FIGS. 10 through 12 show the damping force characteristic of each position ①, ②, and ③.

In addition, as shown in FIG. 6, when the adjuster 40 is turned (pivoted) in a counterclockwise direction as viewed from FIG. 6 with both extension and contraction stroke sides of the damping coefficients placed in the soft (S) positions, the damping coefficient only at the extension stroke side is changed to the hard position (H). On the contrary, if the adjuster 40 is rotated in the clockwise direction, the damping coefficient only at the contraction stroke side is changed to the hard position (H).

It is noted that, in FIG. 6, when the adjuster 40 is rotated it can be halted at any one of the three positions ①, ②, and ③ of the cross-sectional situations of the adjuster 40 sectioned along the lines K—K, along the line M—M and sectioned along the line N—N are shown in FIGS. 7 (A), 8 (A), and 9 (A), FIGS. 7 (B), 8 (B), and 9 (B), and FIGS. 7 (C), 8 (C), and 9 (C), respectively.

In addition, the damping force characteristic for each position of the adjuster 40 is shown in FIG. 10, FIG. 11, and FIG. 12.

Next, the damping characteristic control for the calculation circuit 42 will be described below:

The damping characteristic control will be explained below.

That is to say, the calculation circuit 42 integrates the upper and lower vertical acceleration derived from the vertical G sensor 1 to derive the vertical sprung mass speed. Then, the damping characteristic is set in proportion to the direction of vertical sprung mass speed and magnitude of the same. That is to say, if the vertical sprung mass speed is plus (upward), the damping characteristic side is in the mode of extension hard region HS. If the vertical sprung mass speed is minus (downward), the damping characteristic is controlled in the compression side hard region SH and is controlled so that as the vertical sprung mass speed becomes higher, the damping characteristic is controlled so as to provide the higher damping characteristic. The correction is carried out such that the damping characteristic becomes higher, as the vehicle speed becomes higher on the basis of the input signal from the vehicle speed sensor 5b.

On the basis of the input signals from the steering angle sensor 5a and vehicle speed sensor 5b, the calculation circuit portion 42 determines that the vehicle body is in a rolling generating condition in the case where the steering is carried out, the vehicle speed exceeds a predetermined vehicle speed and the change rate of the steering operation exceeds the predetermined steering change rate and sets any one or two shock absorbers SA at a lateral side of the vehicle body with respect to the weight center which tends to lower the surrounding body in the compression stroke side hard region SH and sets any one or two shock absorbers SA which tends to lift at the extension stroke side hard region HS.

In addition, on the basis of the input signal from the vehicle speed sensor 5b, the calculation circuit portion 42 determines that squat is occurring during an abrupt acceleration of the vehicle. The calculation circuit 42 sets the shock absorbers SA placed at the rear tire wheel sides at which the vehicle body dives at the compression side hard region SH and sets the shock absorbers SA placed at the front tire wheel sides at which the vehicle body lifts at the extension side hard region HS.

In addition, on the basis of the input signal from the brake sensor 5c, the calculation circuit portion 42 determines that nose diving occurs during the braking operation. The shock absorber SA placed at the front tire wheel sides at which the vehicle body dives are controlled in the compression stroke side hard region SH and, on the other hand, the shock absorbers SA placed at the rear tire wheel sides at which the vehicle body is lifted are controlled to provide the extension stroke side hard region HS.

In the way described above, after the optimum damping coefficient (characteristic) of each shock absorber SA is calculated, the signal indicating the drive direction of the corresponding one of the pulse motors 3 to provide the optimum damping characteristic is output via the harness 43 to the determination control circuit portion 4b of each pulse motor 3. Then, the drive of the corresponding one of the pulse motors 3 is determined by the determination control circuit portion 4b according to the stepped position of the corresponding one of the pulse motors 3. The current to drive the corresponding pulse motor 3 is controlled at the drive circuit portion 4c on the basis of its result of determination by means of the determination control circuit portion 4b.

As described above, in the vehicular suspension system of the first preferred embodiment, the determination control circuit portion 4b and drive circuit portion 4c are separated from the damping characteristic control circuit portion 4a, so that the number of wirings in the vehicle body can be reduced without large-sizing of the control portion normally installed on the vehicle passenger compartment.

The determination control circuit portion 4b and the drive circuit portion 4c are integrally installed within the housing 3a of each pulse motor 3. Consequently, the length of the harness 3k which connects the drive circuit portion 4c and the pulse motor 3 becomes short so that the generation of noise and reduction in the actuator's driving torque can be minimized.

Second Preferred Embodiment

A second preferred embodiment of each shock absorber SA shown in FIG. 14 will be described below.

That is to say, the second embodiment teaches that the determination control circuit portion 4b and drive circuit portion 4c are integrally installed on the lower end side of the corresponding one of the pulse motors 300.

Figure 14:
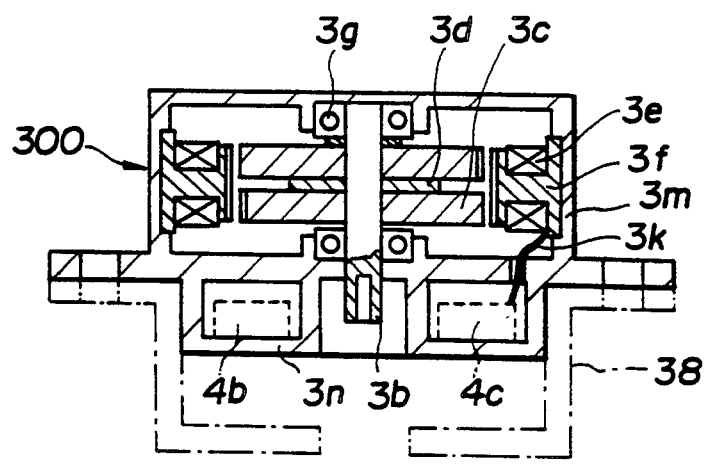
FIG. 14 is an enlarged cross-sectional view of a part of the pulse motor used in a second preferred embodiment of the shock absorber.

FIG. 14 shows an enlarged essential part of each pulse motor 300 used in the second embodiment.

As shown in FIG. 14, a circular lower housing 3n, utilizing a circular gap which serves as a dead space for the bracket 38 and for the output axle 3b, is projected and formed integrally with the lower surface of the housing 3m of the pulse motor 300. In the lower housing 3n the above-described determination control circuit portion 4b and drive circuit portion 4c are housed. The harness 3k is used to connect the drive circuit portion 4b housed in the circular lower housing 3n.

Hence, in the second embodiment, since the motor 300 is not increased in height as compared with the corresponding pulse motor 3 used in the first embodiment, each shock absorber SA can easily be installed on the vehicle without sacrifice of stroke length in the shock absorber SA in the case where the vehicle height is low.

The vehicle behavior detecting means may include such means as for detecting, a control factor related to the vehicle behavior, e.g., a relative speed between the sprung mass and unsprung mass (weight sensor, damping force sensor, and so on), a sensor for detecting a lateral acceleration of the vehicle body, and a sensor for detecting an acceleration in the forward/rearward (longitudinal) direction of the vehicle body.

In the first and second embodiments, the determination control circuit portion 4b and drive circuit portion 4c are integrally installed within the housing of each pulse motor 3 or 300. If the determination control circuit portion 4b and drive circuit portion 4c are installed in the vicinity of the respective pulse motors 3 (or 300), both circuit portions and pulse motors may mutually be separated and connected by means of connectors, respectively.

Third Preferred Embodiment

Figure 15:
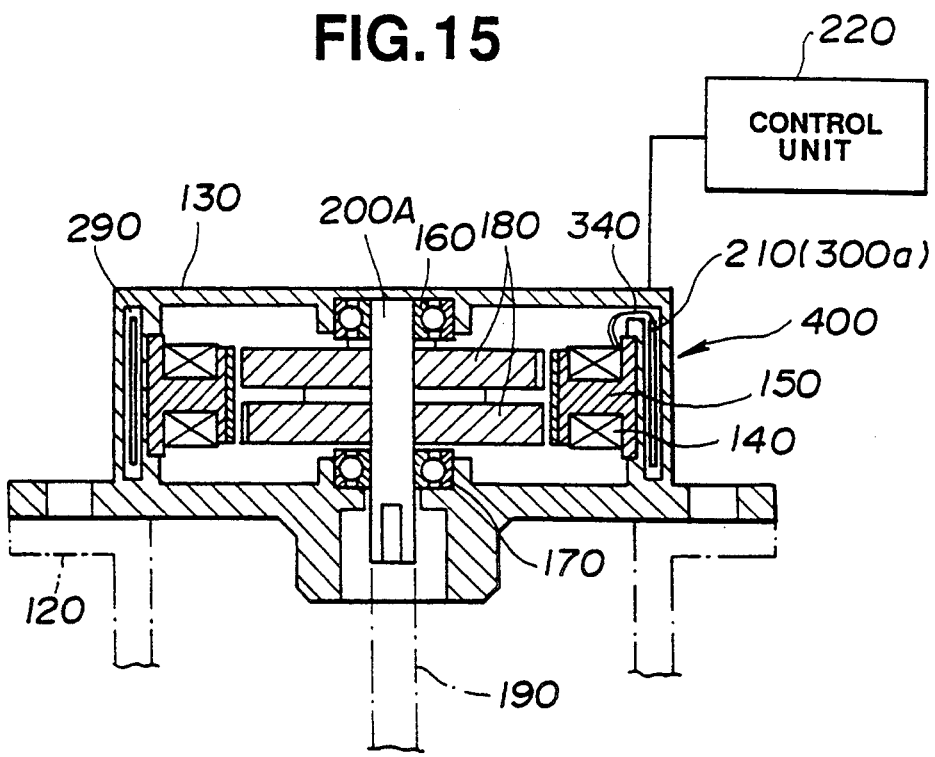
FIG. 15 is a cross-sectional view of a part of the pulse (or so-called, stepping) motor used in a suspension system according to a third preferred embodiment.

FIG. 15 shows an essential part cross-sectional view of the suspension system in a third preferred embodiment.

Figure 16:
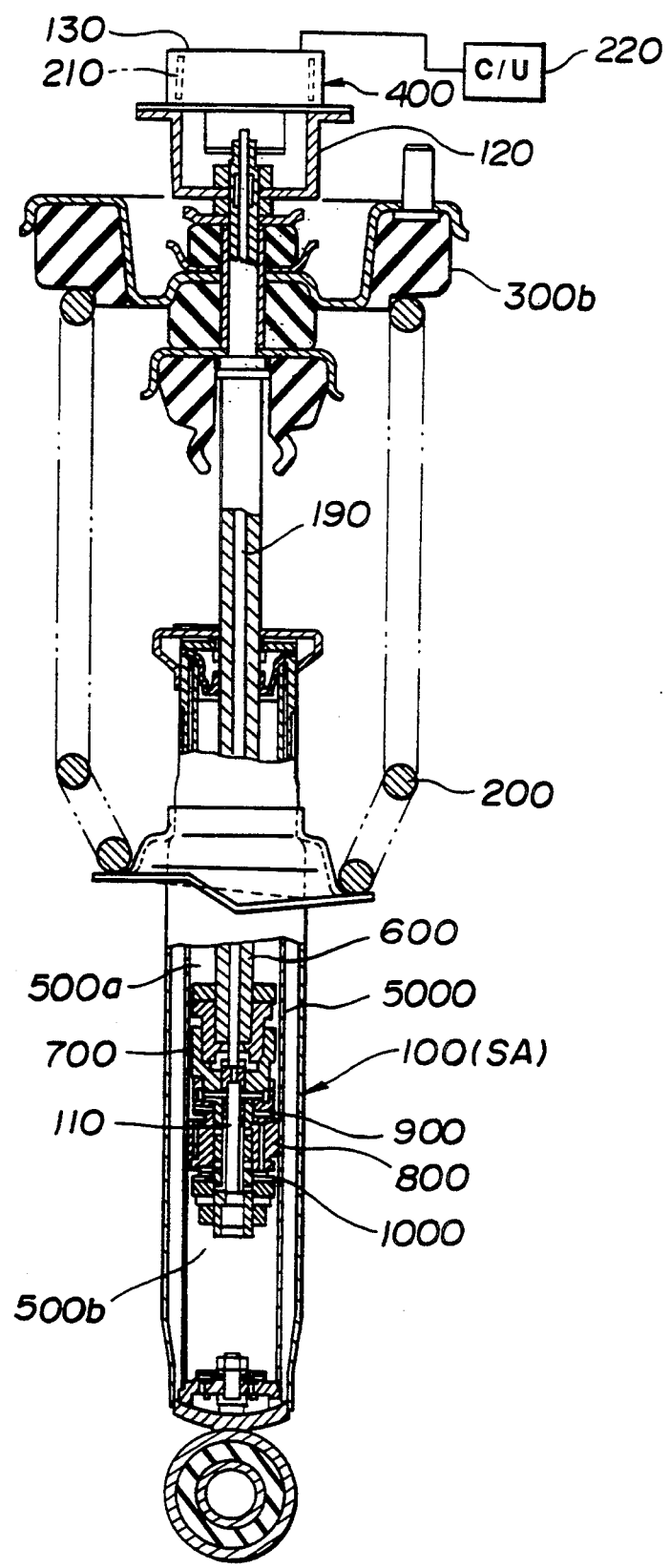
FIG. 16 shows a shock absorber used in the third preferred embodiment.

FIG. 16 shows an overall cross-sectional view of the shock absorber SA in the third preferred embodiment.

In the third embodiment, numeral 200 denotes a suspension spring, numeral 300b denotes an insulator fixed onto the vehicle body, supporting the upper end of the suspension spring 200, numeral 400 denotes the stepping motor which is installed on the upper end of the shock absorber 100 (SA) via the insulator 300b and which serves as the actuator of each damping force varying means.

It is noted that the structure of the shock absorber 100 (SA) below the insulator 300b is substantially the same as that shown in FIG. 3.

As shown in FIG. 16, the one end portion of the piston rod 600 is inserted into the internal space of the cylinder 5000 of a cylindrical type and the piston 800 is fixed onto the stud 700 which slides and defines the upper part liquid chamber 500a and lower part liquid chamber 500b. Expansion (or extension) stroke side and compression (or contraction) stroke side disc valves 900 and 1000 are installed which generate a damping force, providing a flow resistance in the working fluid flowing between the upper and lower chambers 500a and 500b when the piston rod 600 is in either expansion (extension) or compression (contraction) stroke.

A damping force adjustable valve 110 is installed in the stud 700 for varying the damping force, changing the flow area of the bypass passage bypassing each disc valves 900 and 1000.

The stepping motor (also called pulse motor, but herein referred to as the stepping motor) 400, as shown in FIG. 15 includes: a casing 130 of a substantially circular shape as viewed from a top portion of the casing 130, the casing 130 being fixed on the upper end of the piston rod via the cup-shaped retainer 120; a stator 150, installed in the inner space of the casing 130, on an outer periphery of which an electromagnetic coil 140 is wound; a rotor 180 rotatably installed in the inner periphery of the stator 150 via upper and lower bearings 160 and 170; and a drive axle 200A, installed in a center of the rotor 180, which is linked to the damping force adjustable valve 110 via a shaft 190 placed in a hollow portion of the piston rod 600.

It is noted that, as shown in FIG. 15, a thin printed circuit board 210 containing a drive circuit which supplies a control current to the electromagnetic coil 140 is installed within the casing 130, the drive circuit receiving a control signal from the control unit (or controller) 220 installed within the vehicle passenger compartment.

Figure 17:
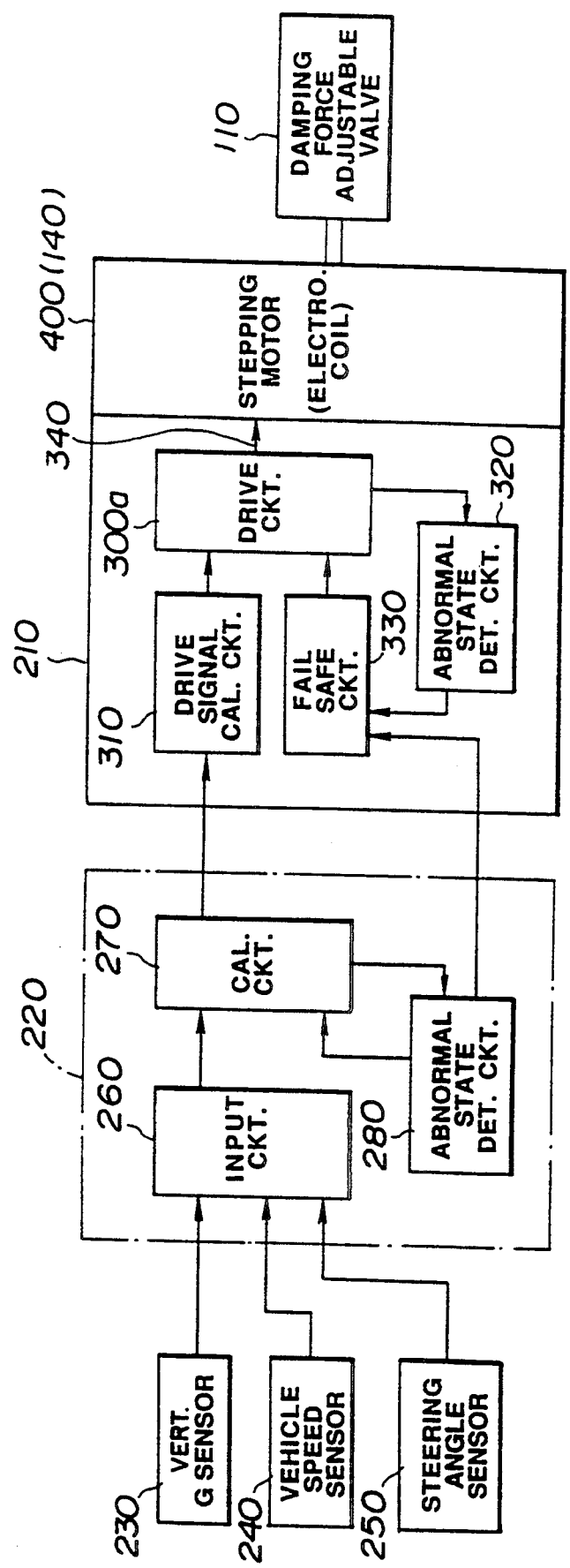
FIG. 17 is a circuit block diagram of control circuitry used in the third preferred embodiment.

The control unit 220 includes: as shown in FIG. 17, an input circuit 260 which inputs the vertical G detection signal from the vertical G sensor 230, vehicle speed signal from the vehicle speed sensor 240, and steering angle information signal from the steering angle sensor 250; and the calculation circuit 270 which receives input information signals from the input circuit 260 and calculates the vehicle behavior on the basis of the input information signals from the input circuit 260; and an abnormal state detection circuit 280 which detects an abnormal state of the control pulse signal output from the calculation circuit 270 to the drive circuit located on the printed circuit board.

On the other hand, the printed circuit board 210 is formed of a flexible circular plate-like material installed within a gap 290 in a circular ring-shaped casing 130.

In addition, on the printed circuit board 210, the following circuits are formed: the drive circuit 300a described above; a drive signal calculation circuit 310 which calculates and outputs the drive signal on the basis of the control pulse signal from the calculation circuit 270; an abnormal state detection circuit 320 which detects an abnormal state of the drive pulse signal derived from the drive circuit 300a to the stepping motor 400; and a fail-safe circuit 330 which operatively secures a safety operation of the stepping motor 400 on the basis of the output signal of the abnormality detection circuit 280 of the control unit 220.

It is noted, as shown in FIG. 17, that a wire 340 having a short length is interconnected between the electromagnetic coil 140 of the stepping motor 400 and the drive circuit 300a.

Hence, in the third embodiment, the printed circuit board 210 containing the drive circuit 300a is installed not within the vehicle passenger compartment but installed in the casing 130 of the stepping motor 400, the length of the wire 340 from the drive circuit 300a to the electromagnetic coil can accordingly be shortened.

Thus, the generation of noises caused by the electromagnetic interference and so on can sufficiently be prevented, thus suppressing a false (not true) pulse signal. Consequently, an erroneous operation of the stepping motor 400 due to the generation of the false pulse signal can be prevented. In addition, the optimum damping force according to the vehicular behavior can be obtained and preferable steering stability and vehicular comfort can be achieved.

Due to the shortening of the wire 340, the reduction of the drive current value flowing through the stepping motor 400 can be avoided and a sufficient drive torque of the stepping motor 400 according to the drive current value can be assured. Consequently, the switching operation speed of the damping force adjustable valve 110 can be improved and the variable damping force responsive characteristic can become fast.

Furthermore, in third embodiment, since the abnormal state of the calculation circuit 270 of the controller 220 is detected by the abnormal detection circuit 280 and a correction signal is output from the abnormal detection circuit 280 to correct the calculation in the calculation circuit 270 and an abnormal operation of the stepping motor 400 is detected by another abnormal detection circuit 320, the fail-safe circuit 330 can provide the safety in operation of the stepping motor 400 itself. Hence, the optimum damping force characteristic can always be obtained by means of the damping force adjustable valve 110.

It is noted that although the wiring length from the control unit 220 to the printed circuit board 210 becomes longer than the conventional, the electromagnetic wave interference tends not to occur since the level of the pulse signal transmitted from the control unit 220 is relatively small.

Figure 18:
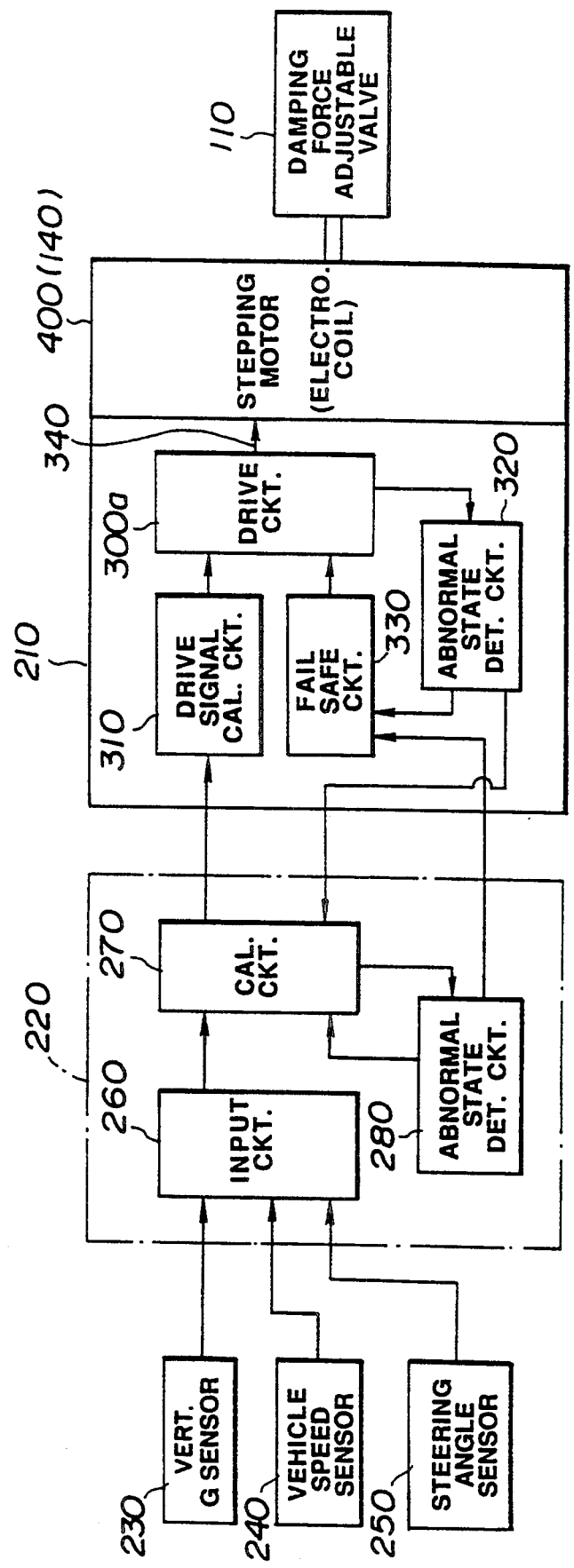
FIG. 18 is a circuit block diagram showing a modification of the control circuitry of FIG. 17.

FIG. 18 shows a modification of the control unit 220 and printed circuit board 210 shown in FIG. 17.

In FIG. 18, the signal indicating the abnormal state of the stepping motor 400 is transmitted to the fail-safe circuit 330 and to the calculation circuit 270 of the control unit 220 to recognize the abnormal state.

Fourth Preferred Embodiment

Figure 19:
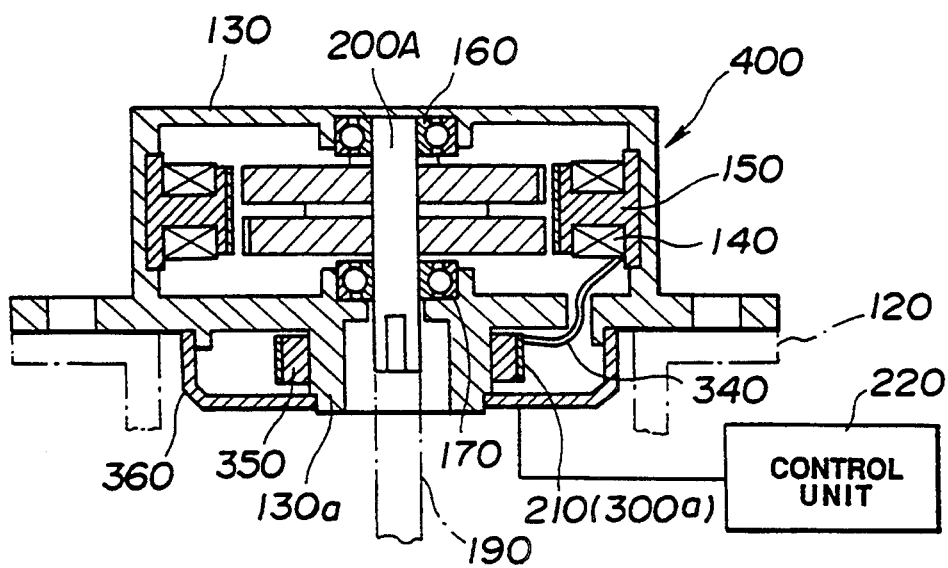
FIG. 19 is a cross-sectional view of the part of the stepping (pulse) motor used in a fourth preferred embodiment of the suspension system.

FIG. 19 shows a fourth preferred embodiment of the suspension system for the vehicle.

In the fourth preferred embodiment, the printed circuit board 210 containing the drive circuit 300a is installed on an outer periphery of a cylindrical portion 130a, installed at the lower part of the casing 130, via a circular retainer 350. The outer periphery of the printed circuit board 210 is covered with a holding member 360 so as to prevent adhesion of external dust on the printed circuit board 210.

As described hereinabove, in the arrangement of the suspension system for the automotive vehicle according to the present invention, at least the drive circuit for the actuator is separated from the control unit and is mounted in the casing of the actuator of the shock absorber so that a wiring length can be shortened between the actuator and drive circuit, thus preventing the generation of radio wave noise and reduction of the actuator's driving torque. In addition, since the wiring length of the connection between the drive circuit and actuator, the false pulse generation in the wire connected between the drive circuit and actuator can be prevented and the erroneous operation of the actuator can be prevented.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An arrangement of a suspension system for an automotive vehicle, comprising:
   a) a plurality of shock absorbers, each having an actuator;
   b) a control unit which is so constructed and arranged as to produce a command signal in accordance with a running condition of the vehicle;
   c) a plurality, corresponding in number to said plurality of shock absorbers, of drive circuits, said drive circuits each being connected to said control unit via wire means, and each being arranged at a position adjacent to a corresponding one of said actuators such that transmission of signals from each drive circuit to the corresponding one of said plurality of actuators is unaffected by any electrical disturbance; and
   d) a plurality, corresponding in number to said plurality of shock absorbers, of determination circuits, each of said determination circuits being electrically connected with a corresponding one of said drive circuits via said wire means and determining a drive direction of drive signals from the corresponding one of said drive circuits to the corresponding one of said plurality of actuators, on the basis of the command signal produced by the control unit and wherein each of said plurality of determination circuits is installed together with the corresponding one of said drive circuits at the position adjacent to the corresponding one of the actuators, both of said plurality of drive and determination circuits being physically separated from said control unit,
   each of said plurality of determination circuits being installed together with the corresponding one of said plurality of drive circuits at a position within a housing of each of said plurality of actuators,
   a printed circuit board containing the corresponding one of said plurality of drive circuits, said printed circuit board being installed within said housing of each of said plurality of actuators,
   each of said plurality of actuators including an electromagnetic coil whose ends are connected to the corresponding one of said plurality of drive circuits via relatively short wires, and
   wherein each of said plurality of actuators comprises a pulse motor having a rotatable output shaft, and wherein said printed circuit board has a circular band-like configuration and is disposed in a narrow gap defined between said housing and the outer periphery of said pulse motor.

2. An arrangement as set forth in claim 1, wherein each said printed circuit board is formed of a flexible, circular plate-like material.

3. An arrangement of a suspension system for an automotive vehicle, comprising:
 a) a plurality of shock absorbers, each having an actuator;
 b) a control unit; and
 c) a plurality, corresponding in number to said plurality of shock absorbers, of drive circuits, each being electrically connected with said control unit and arranged at a position adjacent to a corresponding one of said actuators such that transmission of signals from each drive circuit to the corresponding one of said plurality of actuators is unaffected by any electrical disturbance,
 which further includes a plurality, corresponding in number to said plurality of shock absorbers, of determination circuits, each of said plurality of determination circuits being electrically connected to said control circuit and to one of said plurality of drive circuits, each of said plurality of determination circuits commanding a direction of a drive signal from a corresponding one of said plurality of drive circuits to the corresponding one of said plurality of actuators on the basis of an output signal of the control unit, and wherein each of said plurality of determination circuits is installed together with the corresponding one of said plurality of drive circuits at the position adjacent to the corresponding one of the actuators, both of said plurality of drive and determination circuits being physically separated from said control unit,
 wherein each of said plurality of determination circuits is installed together with the corresponding one of said plurality of drive circuits at an upper position within a housing of the corresponding one of said actuators,
 wherein each of said plurality of determination circuits is installed together with the corresponding one of said plurality of drive circuits at a position within said housing of the corresponding one of said actuators lower than the corresponding one of the actuators,
 wherein a printed circuit board containing the corresponding one of said plurality of drive circuits is installed within said housing of each of said plurality of actuators,
 wherein each of said plurality of actuators includes an electromagnetic coil whose ends are connected to the corresponding one of said plurality of drive circuits via relatively short wires,
 wherein each said printed circuit board is formed of a flexible, circular plate-like material and is mounted in a gap formed at an outer periphery side wall of said housing of the corresponding one of said actuators, and
 wherein each of said printed circuit boards contain the determination circuit associated with the corresponding one of said plurality of drive circuits and an abnormal state detection circuit for detecting an abnormal state of a drive pulse transmitted from the corresponding one of said plurality of drive circuits to the corresponding one of said actuators and a fail safe circuit which assures a safety operation of the corresponding one of said plurality of actuators on a basis of an output signal indicating the abnormal condition of the drive pulse of the corresponding one of said plurality of drive circuits derived from the corresponding one of said abnormal state detection circuits.

4. An arrangement of a suspension system for an automotive vehicle, comprising:
 a) a plurality of shock absorbers, each having an actuator;
 b) a control unit; and
 c) a plurality, corresponding in number to said plurality of shock absorbers, of drive circuits, each being arranged at a position adjacent to the corresponding one of said actuators such that transmission of signals from each drive circuit to the corresponding one of said plurality of actuators is unaffected by any electrical disturbance,
 which further includes a plurality, corresponding in number to said plurality of shock absorbers, of determination circuits, each of said plurality of determination circuits being electrically connected to said control circuit and to one of said plurality of drive circuits, each of said plurality of determination circuits commanding a direction of a drive signal from a corresponding one of said plurality of drive circuits to the corresponding one of said plurality of actuators on the basis of an output signal of the control unit, and wherein each of said plurality of determination circuits is installed together with the corresponding one of said plurality of drive circuits at the position adjacent to the corresponding one of the actuators, both of said plurality of drive and determination circuits being physically separated from said control unit,
 wherein each of said plurality of determination circuits is installed together with the corresponding one of said plurality of drive circuits at an upper position within a housing of the corresponding one of said actuators,
 wherein each of said plurality of determination circuits is installed together with the corresponding one of said plurality of drive circuits at a position within said housing of the corresponding one of said actuators lower than the corresponding one of the actuators,
 wherein a printed circuit board containing the corresponding one of said plurality of drive circuits is installed within said housing of each of said plurality of actuators,
 wherein each of said plurality of actuators includes an electromagnetic coil whose ends are connected to the corresponding one of said plurality of drive circuits via relatively short wires, and
 wherein each of said printed circuit boards is wrapped around a circular retainer and is covered with a holding member so that the corresponding one of said printed circuit boards is not exposed externally.

5. An arrangement of a suspension system for an automotive vehicle, comprising:
 a) a plurality of shock absorbers, each having an actuator;
 b) a control unit which is so constructed and arranged as to produce a command signal in accordance with a running condition of the vehicle;
 c) a plurality, corresponding in number to said plurality of shock absorbers, of drive circuits, said drive circuits each being connected to said control unit via first wire means, and each being arranged at a position adjacent to a corresponding one of said actuators such that transmission of signals from each drive circuit to the corresponding one of said plurality of actuators is unaffected by any electrical disturbance; and d) a plurality, corresponding in number to said plurality of shock absorbers, of determination circuits, each of said determination circuits being electrically connected with a corresponding one of said drive circuits via second wire means and determining a drive direction of drive signals from the corresponding one of said drive circuits to the corresponding one of said plurality of actuators, on the basis of the command signal produced by the control unit and wherein each of said plurality of determination circuits is installed together with the corresponding one of said drive circuits at the position adjacent to the corresponding one of the actuators and within a housing of each of said plurality of actuators, both of said plurality of drive and determination circuits being physically separated from said control unit, a printed circuit board containing the corresponding one of said plurality of drive circuits, said printed circuit board being installed within said housing of each of said plurality of actuators, wherein each of said plurality of actuators includes an electromagnetic coil whose ends are connected to the corresponding one of said plurality of drive circuits via relatively short wires, and wherein each of said plurality of actuators comprises a pulse motor having a rotatable output shaft, and wherein said printed circuit board has a circular band-like configuration and is disposed in a space defined about a boss portion of said housing which extends about said output shaft.

* * * * *